United States Patent [19]

Watabe et al.

[11] Patent Number: 4,580,400
[45] Date of Patent: Apr. 8, 1986

[54] METHOD AND APPARATUS FOR ABSORBING WAVE ENERGY AND GENERATING ELECTRIC POWER BY WAVE FORCE

[75] Inventors: Tomiji Watabe, Noboribetsu; Hideo Kondo; Kenji Yano, both of Muroran, all of Japan

[73] Assignee: Muroran Institute of Technology, Muroran, Japan

[21] Appl. No.: 734,169

[22] Filed: May 15, 1985

[30] Foreign Application Priority Data

Aug. 30, 1984 [JP] Japan ................. 59-179313

[51] Int. Cl.⁴ .............................................. F16D 31/02
[52] U.S. Cl. ....................................... 60/398; 60/502; 60/506; 290/53; 417/330

[58] Field of Search ................. 60/398, 499, 502, 506; 290/42, 53; 417/330, 332

[56] References Cited

U.S. PATENT DOCUMENTS

| | | | |
|---|---|---|---|
| 4,317,047 | 2/1982 | de Almada | 290/53 |
| 4,400,940 | 8/1983 | Watabe et al. | 417/330 X |
| 4,490,621 | 12/1984 | Watabe et al. | 417/330 X |

Primary Examiner—Stephen F. Husar
Attorney, Agent, or Firm—Spencer & Frank

[57] ABSTRACT

According to the present invention, a simple, strong and economical resonant type apparatus for absorbing wave energy which can generate electric power at high efficiency, yet can withstand extraordinary sea phenomenon such as typhoon with minimum investment and maintainance costs.

13 Claims, 10 Drawing Figures

FIG_6
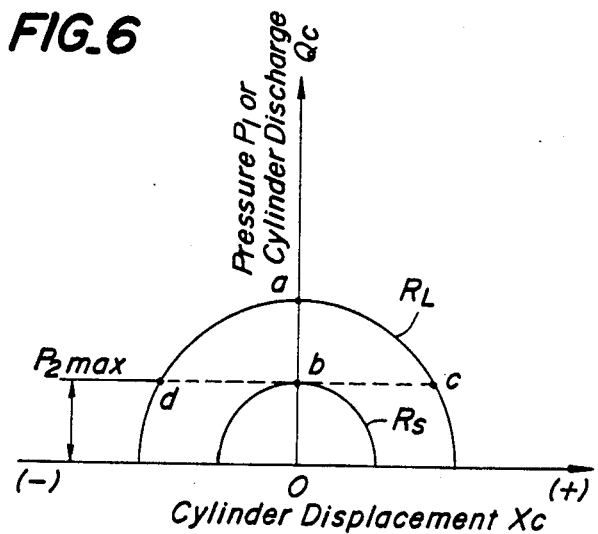
FIG_7
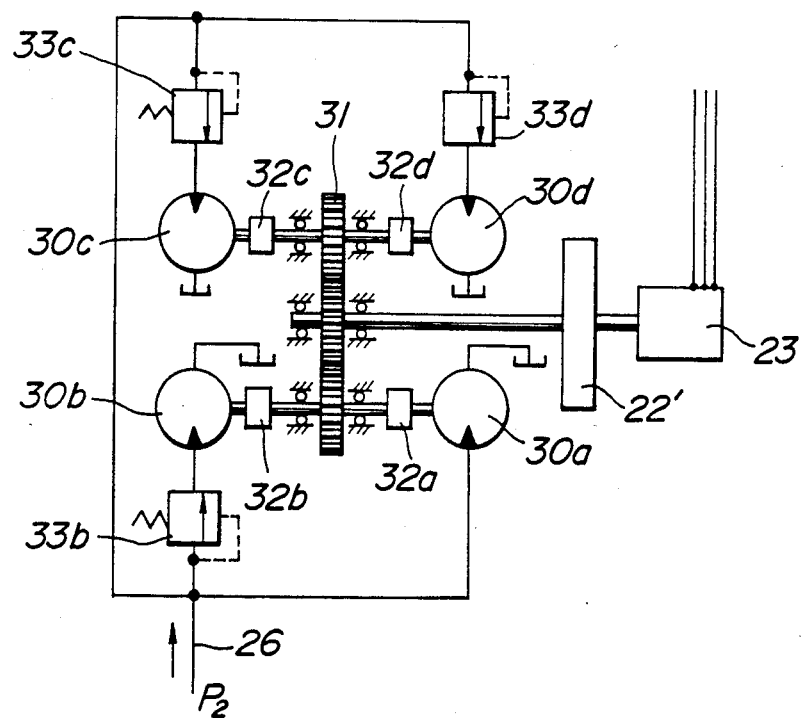

METHOD AND APPARATUS FOR ABSORBING WAVE ENERGY AND GENERATING ELECTRIC POWER BY WAVE FORCE

BACKGROUND OF THE INVENTION

1. Field of the Invention

The present invention relates to a method and an apparatus for absorbing wave energy and generating electric power by wave force, more particularly to a resonant type method and apparatus for absorbing wave energy and generating electric power by wave force, wherein a pendulum with a pressure-receiving plate is reciprocally swung or rocked by stationary waves in a caisson and the reciprocal movement of the pendulum is converted to electric power.

2. Description of the Prior Art

The inventors had formerly invented a basic apparatus wherein an incident wave is reflected from a back plate of a caisson to yield a reflected wave which is subsequently overlaid by a next incident wave to form a synthesized or multiplicated wave which is called as stationary wave and a pendulum arranged in the caisson at the node of the stationary wave is reciprocally driven or swung by the stationary waves to convert wave energy to useful available energy at high efficiency with a simple structure and cheap investment and maintainance costs and filed therefor a U.S. patent application Ser. No. 238,523, British patent application Ser. No. 8,106,678 and a Canadian patent application Ser. No. 372,213, which is not issued on U.S. Pat. No. 4,400,940, British Pat. No. 2,071,772 and Canadian Pat. No. 1,164,767. The descriptions of the patents are stated herein by references.

The structure of the basic apparatus of U.S. Pat. No. 4,400,940 is shown in FIGS. 1 and 2.

Equation of motion regarding the pendulum 7 in the basic apparatus as shown in FIG. 2 is expressed as follows:

$$I\ddot{\theta} + (N_1 + N_2)\dot{\theta} + K\theta = Fw \sin\left(\frac{2\pi}{Tw} t\right) \quad (1)$$

wherein,

I: moment of inertia of the pendulum in regard to the swinging center $O_P$ (including those portion caused by additional water mass), $\theta$: swinging angle of the pendulum $\dot{\theta}$: velocity of swinging angle of the pendulum, $\ddot{\theta}$: angular acceleration of the pendulum, $N_1\dot{\theta}$: moment of the pendulum by generating waves, $N_2\dot{\theta}$: resistive moment of the hydraulic pressure cylinder or piston and cylinder assembly 10 (caused by orifice or the like restriction to the output of the cylinder), $K\theta$: righting moment of the pendulum (caused by displacement of centroid or the like), Fw: amplitude of swinging moment caused by wave force, and Tw: wave period.

The inventors have made many researches and experiments to find out that the energy which actuates the hydraulic pressure cylinder 10 can be made maximum (i.e. the rate of absorbing the energy of wave force is maximum) at the following conditions of:

(i) making the swinging period $T_p$ of the pendulum to coincide with wave period Tw, thus creating a resonant state, (ii) making $N_1 = N_2$. At a given wave force condition, $N_1$ is represented by a constant. Namely, resistive moment $N_2\dot{\theta}$ caused by the hydraulic cylinder 10 should be proportional (linear resistance) to the swinging velocity $\dot{\theta}$ of the pendulum 7, (iii) arranging the pendulum 7 at the position of the node of the stationary wave.

In the apparatus shown in FIG. 2, if $T_p$ is made equal to Tw or $T_p = $Tw by e.g. adjusting the position of the centroid of the pendulum 7 relative to a given wave force condition and characteristic property of the restriction such as orifice of the output of the hydraulic pressure cylinder is approached to a laminar flow such that the magnitude of the output becomes $N_1 = N_2$ and fixed thereto, the wave force energy can be converted to thermal energy most efficiently.

The basic apparatus of U.S. Pat. No. 4,400,940 is superior to conventional apparatuses in that it has in water no bearings and the other parts which necessitate maintainance, and it is simple in structure so that investment and maintainance costs are cheap especially when converting wave force energy to oil pressure energy by using the hydraulic pressure cylinder 10.

Afterwards, the inventors had improved and developed the basic apparatus to complete another invention and filed it as a Japanese patent application No. 22,822/81 (Japanese patent application laid-open No. 137,655/82). The invention of the application No. 137,655/82 is superior to the basic apparatus in that it acquires energy of good quality, especially in that it converts wave force energy economically to A.C. current of constant frequency and good quality which can be connected to the public electric power network.

The invention of No. 137,655/82 is a method of generating electric power by wave force characterized in that a hydraulic pressure cylinder is actuated by a pendulum which is swung by waves to discharge oil from the cylinder, a synchronous or induction generator has been preliminarily connected to the public electric power network for revolution at a constant revolution rate, the generator is actuated by at least one oil pressure motor which uses the discharged oil as a pressure source, and a volume to be expelled by the oil pressure motor is varied in proportion to a pressure acting on the hydraulic pressure cylinder, whereby a load acting on the pendulum caused by the cylinder is made proportional to a swinging velocity $\dot{\theta}$ of the pendulum and the magnitude of the load acting on the pendulum is made equal to the moment of the pendulum by generating waves.

The invention of No. 137,655/82 relates also to an apparatus for generating electric power by wave force, comprising at least one caisson having a bottom plate, a back plate and side plates opening in an opposite side of the back plate and opening at least a part of an upper portion of the caisson to form therein a water chamber, the caisson being arranged to form at least structural element or part of a breakwater, bank and the like facing to the sea, the water chamber having a length Bc' which is longer than ¼ of the wave length Lc in the water chamber to generate stationary wave in the water chamber, and a pendulum having a natural period $T_p$ in swinging or rocking substantially the same as periods $T_w$ of stationary wave of water caused in the water chamber and arranged in the caisson at a node position i.e. at a distance from the back plate one fourth or Lc/4 of the length Lc of the wave length in the water chamber so as to be swung by the stationary wave thereby to absorb wave energy to convert it into electric or heat energy, characterized in that the apparatus comprises a hydraulic pressure cylinder actuated by the pendulum to discharge oil therefrom, at least one oil pressure motor connected to the hydraulic pressure cylinder and driven by the oil discharged from the cylinder to expel a volume which is proportional to the discharged oil pressure, and a synchronous or induction generator preliminarily connected to the public electric power network for revolution at a constant revolution rate, a load acting on the pendulum caused by the hydraulic pressure cylinder being proprtional to the swinging velocity $\dot{\theta}$ of the pendulum, and the magnitude of the load acting on the pendulum being equal to the moment of the pendulum by generating waves.

However, improvements of the apparatus of No. 137,655/82 have still been earnestly desired and requested to improve its strength such that it has (i) a sufficient strength to withstand extraordinary sea phenomenon such as typhoon, as well as (ii) economicity that can substitute for conventional energies.

The inventors have previously filed a Japanese patent application No. 60,869/82 (patent application laid-open No. 178,879/83) for improving the invention of No. 137,655/82, and is directed to an improvement of the quality of the electric energy to be obtained just similarly as the invention of No. 137,655/82, in that it removes periodical fluctuation of the output of the electric power generated by wave force due to periodicity of the wave force energy, and is not directed to an improvement of the strength of the apparatus such that it can withstand an extraordinary sea phenomenon such as typhoon. In addition, though the invention of the No. 178,879/83 has a second purpose of maintaining the efficiency of the electric generation as high as possible over a wide range of wave height so as to improve the above point (ii), a further improvement of the economicity of the apparatus has still been desired, while improving the stremgth of the apparatus as described in the above point (i).

Wave energy is approximately proprtional to square of wave height. Generally, wave height at the time of typhoon is about 5 times of wave height of usual climate, so that wave energy at the time of typhoon reaches to about 25 times of that of usual climate. From a necessity of withstanding wave pressure at the time of typhoon, the apparatus had to be constructed very strong and tough, so that construction cost became increased and operation efficiency at usual climate became lowered. So, there was a dilemma always.

Therefore, heretofore, an apparatus for generating electric power from wave energy has been desired which is simple in structure and cheap in investment and maintainance costs and yet can withstand an extraordinary sea phenomenon such as typhoon and still has a high operation efficiency at usual climate.

SUMMARY OF THE INVENTION

It is an object of the present invention to improve the above points (i) and (ii) of the inventors' prior apparatus of No. 137,655/82 very effectively without directly making the apparatus strong, by controlling the excesive wave pressure acting on the pendulum at an extraordinary sea phenomenon by utilizing wave movement.

The present invention relates to a method of generating electric power by wave force energy wherein a pendulum with a pressure-receiving plate is hanged at a position of a node of a stationary wave in a caisson and swung by the stationary wave in reciprocal movement and a hydraulic pressure cylinder is actuated by the reciprocal movement of the pendulum to discharge oil therefrom and the oil pressure of the discharged oil is converted to electric energy, comprising, severing an upper excessive part of an incident wave by an incident wave-severer at front sea side of the pendulum when wave height of the incident wave exceeds a given limit height due to extraordinary sea phenomenon such as typhoon, introducing the severed upper part into a small water chamber before the pendulum to raise the water level and water pressure therein so as to partially offset or decrease the incident wave pressure pushing the pendulum, reversing a water flow in the water level raised small water chamber in an oblique lower backward direction by means of an oblique back plate which forms an upper part of the back plate and a top plate connected thereto to increase water pressure in front of the pendulum and to offset or decrease the incident wave pressure pushing the pendulum, impinging a part of the reversed flow upon the front surface of the forwardly swinging pendulum to increase wave pressure in front of the swinging pendulum and offset or decrease the incident wave pressure, and discharging a part of the reversed flow into the sea behind the pendulum over the pressure-receiving plate of the pendulum to decrease or lower water level and water pressure in the small water chamber and to increase or raise water level and water pressure in the sea behind the pendulum so as to decrease or offset the water pressure in the small water chamber which swings the pendulum back to the sea direction, whereby excessive wave pressure which would act on the pendulum at the time of extraordinary sea phenomenon such as typhoon is prevented by the direct control of wave pressures in the caisson utilizing the wave movement.

Another aspect of the present invention is to provide a resonant type apparatus for generating electric power by wave force including at least one caisson having a bottom plate, a back plate and side plates opening in an opposite side of the back plate and opening at least part of an upper portion of the caisson to form therein a water chamber, said caisson being arranged to form at least part of a breakwater, bank and the like facing to the sea, a pendulum with a pressure-receiving plate having a natural period in swinging or rocking substantially the same as periods of stationary wave surges of water caused in the water chamber and arranged in the caisson at a distance from the back plate one fourth or ¼ of lengths Lc of the stationary wave surges which swing or rock the pendulum to absorb wave energy to convert it into electric energy, comprising an incident wave-severer arranged in the caisson at the sea side relative to the pendulum for severing an excessive upper part of an incident wave which exceeds a given limit height at the time of an extraordinary sea phenomenon such as typhoon to introduce the severed excessive upper part of the incident wave into a small water chamber formed in the caisson between the pendulum and the back plate over the pressure-receiving plate of the pendulum, and a guide means composed of an oblique back plate which forms an upper part of the back plate facing obliquely and downwardly to the pendulum and a top plate connected to the oblique back plate for reversing the water flow in the small water chamber obliquely and downwardly to impinge a part of the reversed flow upon the front surface of the pendulum and to discharge main part of the reversed flow into the sea behind the pendulum over the pressure-receiving plate of the pendulum. By this arrangement, wave pressure in front of the forwardly swinging pendulum is increased, the wave pressure of the incident wave pushing or forcing the pendulum forward to the back plate direction is reduced or offset, and the water pressure in the small water chamber swinging the pendulum back to the sea direction is decreased, at the time of extraordinary sea phenomenon such as typhoon.

The height at which the incident wave is severed can be held constant relative to the incident wave regardless of change of tidal level, if the height of the blade of the incident wave severer is manually or automatically adjusted depending on ebb and flow of the tide by means of e.g. a hydraulic cylinder.

The severer may also play a role of a stopper for preventing an excessive swinging movement of the pendulum to the sea direction. The stopper may be provided with a cushion member at the rear surface thereof for safely protecting the apparatus without causing a trouble.

The apparatus may be provided with a stopper together with a cushion member at its surface opposing the pendulum in the caisson at the front upper portion of the caisson to prevent the excessive swing of the pendulum to the back plate direction. The stopper can securely prevent the apparatus without causing a trouble. The stopper is preferably be arranged so as not to obstruct the free fall of the wave water reversed or guided from the back plate by the guide means. That is, the stopper is preferably be arranged in such a fashion that the guided wave passes over the pressure-receiving plate of the pendulum into the sea behind the pendulum in a proper proportion, or as much as possible.

The present invention can advantageously use the structure of Japanese application No. 137,655/82 without any hindrance, because the present invention is an improvement of No. 137,655/82.

In a preferred embodiment, the apparatus of the present invention comprises a hydraulic pressure cylinder actuated by the pendulum to discharge oil therefrom, at least one oil pressure motor connected to the hydraulic pressure cylinder and actuated by the discharged oil pressure to rotate with an expelled volume proportional to the discharged oil pressure, and a synchronous or induction generator connected to the public electric power network for revolution at a constant revolution rate, whereby a load acting on the pendulum caused by the hydraulic cylinder is made proportional with a swinging velocity $\theta$ of the pendulum, and the magnitude of the load acting on the pendulum is made equal with the moment of the pendulum by generating waves.

In a preferred embodiment, the apparatus of the present invention comprises a pressure-reducing device arranged independently from a device of controlling a relief pressure of the oil pressure motor and controls the maximum value of the discharged oil pressure $P_2$ acting on the oil pressure motor to a smaller value than an overload of the oil pressure motor.

In a preferred embodiment, the apparatus of the present invention comprises an adjusting device which adjust the proportional constant $\beta m$ of the pressure compensator of the oil pressure motor in proportion with a change of the moment of wave generation.

The water in the small water chamber between the pendulum and the back plate is usually swung back and forth in the wave direction. At this state, when a large incident wave swings the pendulum to a forward direction, i.e., the back plate direction, the water in the small water chamber is blown up in substantially vertical upward direction with violent intensity, if there is no guide means. However, because there is the guide means composed of an oblique back plate and the top plate connected thereto, it becomes possible that the swung water in the small water chamber be reversed or returned obliquely, backwardly and downwardly mainly in the sea behind the pendulum over the pressure-receiving plate of the pendulum. Because the incident wave-severer severs a top part of an excessively large wave to introduce the severed top part of the wave into the small water chamber in front of the pendulum, the swinging motion of the pendulum to the back plate is reduced.

BRIEF DESCRIPTION OF THE DRAWINGS

For a better understanding of the invention, reference is made to the accompanying drawings, in which:

FIG. 6 is a characteristic graph thereof showing a relation between a displacement value $X_c$ of a piston of a hydraulic pressure cylinder and an oil pressure $P_1$ supplied from the hydraulic pressure cylinder through a flow rectifier valve by the swinging movement of the pendulum; and FIG. 7 is a schematic view showing a diagram of a circuit thereof wherein a plurality of constant volume type oil pressure motors are used instead of the variable volume type oil pressure motor of FIG. 5.

Figure 1:
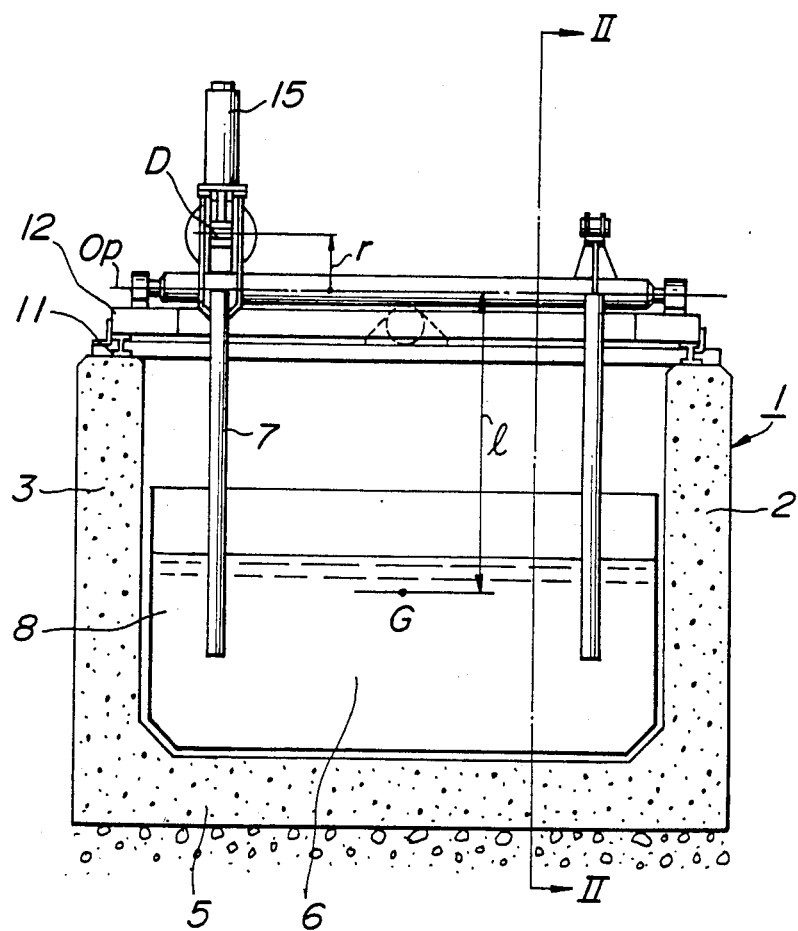
FIG. 1 is a front view partially in cross section of the inventors' prior resonant type basic apparatus of our U.S. Pat. No. 4,400,940 for generating electric power by wave force.

Throughout different views of the drawings, the reference numerals indicate the followings:

1 ... caisson, 2 and 3 ... side plates, 4 ... back plate, 5 ... bottom plate, 6 ... water chamber, 7 ... pendulum, 7' ... upper open gate or mouth of the pendulum 7, 8 ... pressure-receiving plate of the pendulum 7, 8' ... upper edge of the pressure-receiving plate 8, 10 ... hydraulic pressure cylinder or a piston and cylinder assembly, 10' ... piston rod, 11 ... rails, 12 ... supporting table, 13 ... cylinder, 15, 16, 19, 26, 27 and 28 ... pipe lines, 17 ... flow rectifier valve, 18 ... oil tank, 20 ... pressure reducing valve, 21 ... oil pressure motor with a pressure compensator, 22 ... flywheel with a one way clutch, 22' ... flywheel without a one way clutch, 23 ... AC current generator, 24 ... relief valve, 25 ... pressure accumulator, 30a, 30b, 30c and 30d ... oil pressure motors, 31 ... gear assembly, 32a, 32b, 32c and 32d ... one way clutches, 33b, 33c and 33d ... sequence valves, 40 ... oblique back plate, 41 ... top plate, 42 ... severer for severing a top part of extraordinary high incident wave, 43 ... stopper, 44 ... cushion member, 45 ... slide member, 46 ... lower tip end of the slide 45, 47 ... cylinder, Bc ... distance between the back plate 4 and the pendulum 7, Bc' ... length of the water chamber 6, C ... current flow lines, D ... pivotal point of the cylinder 10 pivoted to the pendulum 7, F ... small water chamber between the back plate 4 and the pendulum 7, G ... centroid of the pendulum, $h_p$ ... height of the pressure-receiving plate 8, Lc ... wave length in the water chamber 6, l ... distance of the swinging center $O_p$ from the centroid G of the pendulum 7, N ... node of a stationary wave, L ... calm water level, $L_1$, $L_2$ ... swinging or moving water level, Hc ... water depth in the water chamber 6, $O_p$ ... swinging center of the pendulum 7, r ... distance between the swinging center $O_p$ and the pivotal point D, $P_1$ and $P_2$ ... oil pressures, Qc ... volume expelled from the cylinder 10, $R_S$ and $R_L$ ... semicircles, $v_1$ and $v_2$ ... wave velocities, $X_c$ ... displacement of the hydraulic cylinder 10.

DETAILED DESCRIPTION OF THE PREFERRED EMBODIMENT

Figure 2:
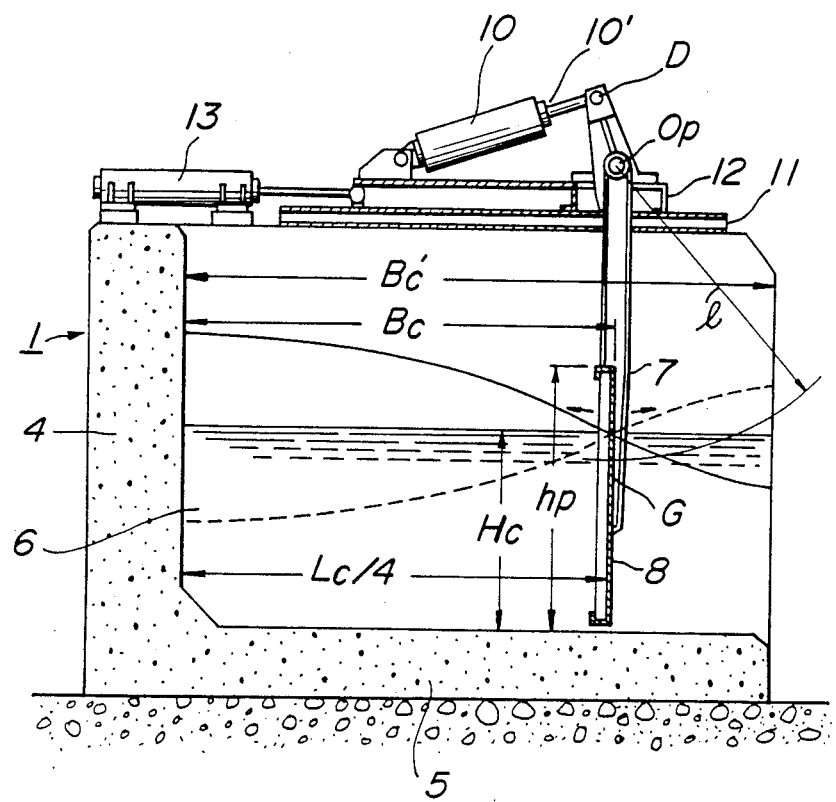
FIG. 2 is a cross sectional view of FIG. 1 along the line II—II.
Figure 3:
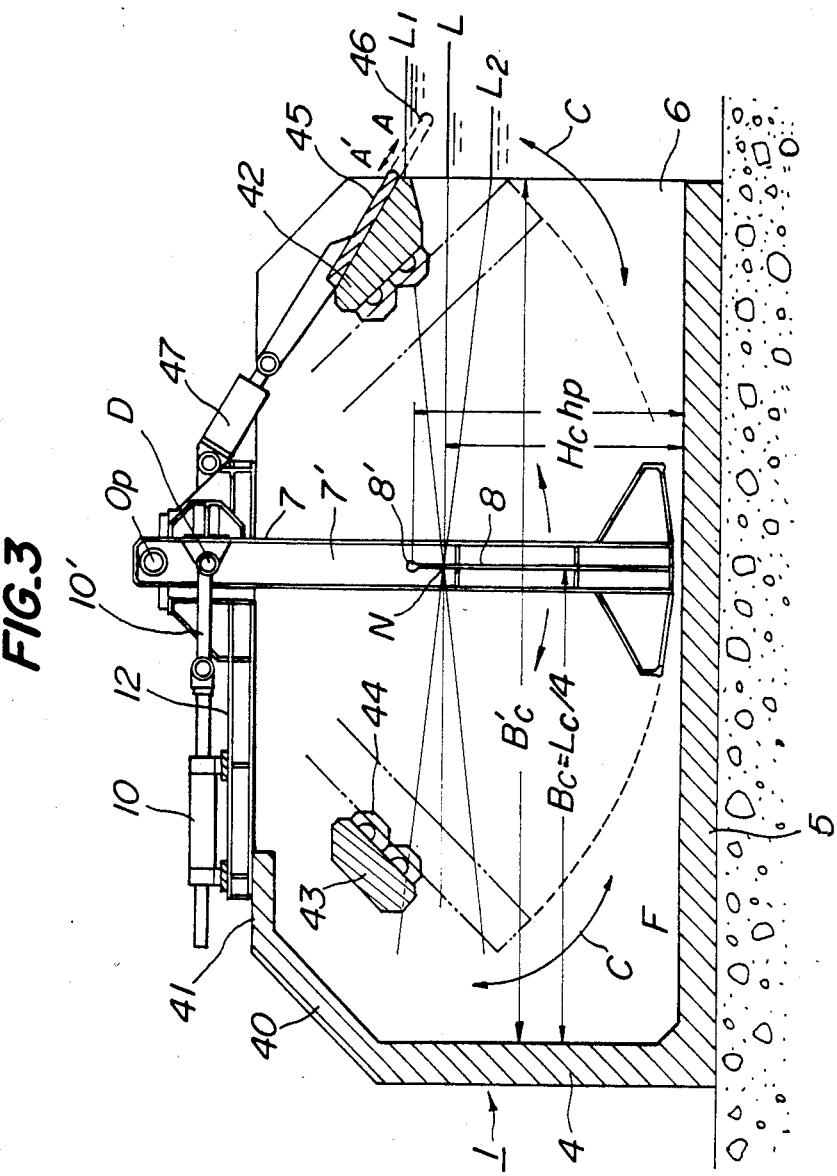
FIG. 3 is a schematic side view partially in cross section of an embodiment of the apparatus of the present invention.

In FIG. 3, an embodiment of the apparatus of the present invention is shown in correspondence with FIGS. 1 and 2.

Referring to FIG. 3, a surging incident wave is introduced in the caisson 1 into the water chamber 6 of a length Bc' and is reflected by the back plate 4 to form a stationary wave having a node thereof at a distance Bc=Lc/4 from the back plate 4. At the node position N, the pendulum 7 is hanged down from a support table 12 which is arranged on the caisson 1 and pivotally connected to a piston rod 10' of the hydraulic pressure (in this embodiment, oil pressure) cylinder 10 at the pivot D. The pendulum 7 has a pressure-receiving plate 8 of a height hp and is swung or rocked by a reciprocal horizontal wave flow about the swinging center Op thereof. The swinging movement of the pendulum 7 actuates the hydraulic pressure cylinder 10 thereby to convert wave force energy to oil pressure energy.

Flow lines of the stationary wave are depicted as substantially horizontal at the node position thereof, substantially upward and downward diection at the expanded belly portion thereof, and substantially as flow lines C at the intermediate portion between the node portion and the belly portion. Water surface in this case moves up and down as shown by lines $L_1$ and $L_2$. Amount of the surface movement is maximum at the belly portion and minimum at the node portion at point N.

When an incident wave is so high that its wave height exceeds the pressure-receiving plate 8 of the height hp, the excessive top part of the wave passes through the pendulum 7 through the open gate 7' of the pendulum 7 without giving a swinging force to the pendulum 7. However, at a state wherein the incident wave has changed to a stationary wave, level of water surface is minimum at the point N and rises before and after the point N as shown in the drawing, so that in the swinging course of the pendulum 7 a stationary wave is rarely formed which exceeds the upper end 8' of the pressure-receiving plate 8. Accordingly, unless a special device is provided as in the present invention, the same situation occurs as in the inventors' prior apparatus of No. 137,655/82, so that a sufficient effect in preventing the function of excessively large wave force in extraordinary sea phenomenon can never be achieved.

The apparatus shown in FIG. 3 is differentiated from the inventors' prior apparatus of No. 137,655/82 in the following points. At first, the upper part 40 of the back plate 4 is inclined obliquely and downwardly as shown in the drawing, which with the top plate 41 connected thereto forms a guide wall for reversing the wave flow. Next, a severer 42 is arranged in the caisson 1 at sea side of the pendulum at the entrance of the water chamber 6 for severing an excessively high upper part of an incident wave of an extraordinary high wave height. The severer 42 can be provided at its upper surface with a slide member 45 which is slidable in the directions of arrows A, A' along the upper surface of the severer 42 by means of a cylinder 47. The right distal edge 46 of the slide member 45 serves as a blade of the severer 42 for severing the incident wave. The position of the severing edge 46 can be held constant relative to the incident wave regardless of changes of tidal level, if the position of the slide member 45 is adjusted by the cylinder 47 to a high or low position in conformity with ascended or descended level of stationary calm water surface L resulting from ebb and flow of the tide. The severer 42 can also play a role of a stopper for the pendulum 7 and is provided with a cushion member 44 at its rear surface for softening impact of the impingement of the pendulum 7 to the severer or stopper 42. The caisson 1 can also be provided with a stopper 43 having a cushion member 44 in the caisson 1 in front of the pendulum 7 at a position not to obstruct the reverse flow of wave in the small water chamber F reversed from the guide plates 40 and 41. The stoppers 42 and 43 serve to restrict the swinging angle of the pendulum 7 within a given range without destructing the apparatus, while allowing maximum generation of electric power by the swinging movement of the pendulum 7.

Referring to FIG. 4, a principle of the present invention for solving a problem of preventing an action of excessive wave force at the time of the extraordinary sea phenomenon is shown with elapse of time. Thus, the apparatus of the present invention is swung at the pendulum by an extraordinary wave in the order as shown in FIGS. 4(a)-(d) with sequence of time.

Figure 4A:
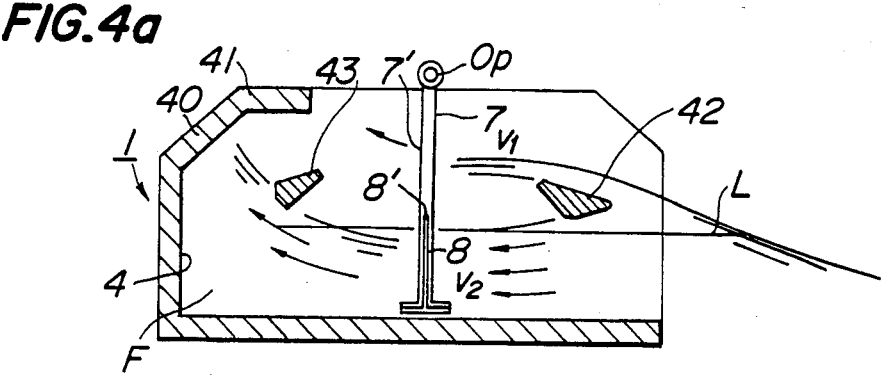
FIGS. 4(a)-(d) are explanational graphs illustrating the principle of the method of the present invention.

FIG. 4(a) illustrates a moment at which the pendulum 7 swung in clockwise direction by an extraordinary high incident wave passes the vertical position thereof. A severer 42 serves as a blade for severing an excessive top part of the extraordinary high incident wave as shown in the drawing, whenever such extraordinary high wave surges on the pendulum from the open sea. In such a case, the wave flow has a larger velocity $v_1$ at the upper part thereof than a velocity $v_2$ at the lower part thereof ($v_2 < v_1$, because the pressure-receiving plate 8 has a resisting action against the lower part of the wave flow), the upper part of the wave flow passes over an upper edge 8' of the pressure-receiving plate 8, namely through an upper gate or mouth 7' of the pendulum 7, and is introduced directly into a small water chamber F. As a result, the water level in the small water chamber F is raised to oppose or counter the wave pressure of the lower wave flow of the incident wave, so that the swinging force acting on the pendulum 7 in this case to the clockwise direction is decreased. The water existing in the small water chamber F is moved in the same direction with the pendulum 7, so that the water level is increased at the back plate 4.

Figure 4B:
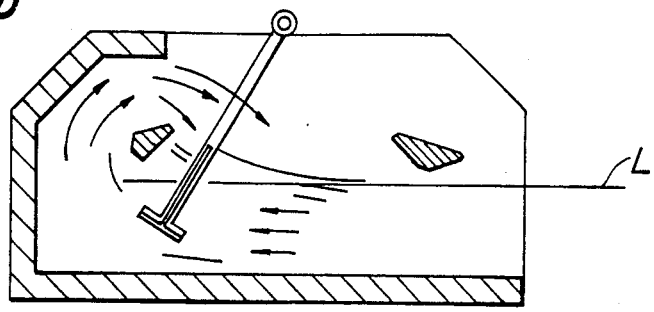

In FIG. 4(b), the pendulum 7 is swung forth in clockwise direction further to raise the water in the small water chamber F upwardly along the back plate 4 to an extent that the wave flow is reversed by the oblique back plate 40 and the top plate 41 and partially impinged upon the front surface of the swinging pendulum and mainly discharged to the exterior of the small water chamber F through the upper mouth 7' of the pendulum 7. By the reversal of the water flow, the water pressure in the small water chamber F is increased and the incident wave pressure pushing the pendulum to the leftward swinging direction is offset or decreased. By the impingement of a part of the reversed water flow upon the front surface of the forwardly swinging pendulum, wave pressure in front of the swinging pendulum is increased and the incident wave pressure is offset or decreased. By the discharge of a main part of the reversed water flow to the exterior thereof through the open mouth 7' of the pendulum 7, the amount of water in the small water chamber F is decreased and the water level behind the pendulum is increased promplty so that the subsequent rightward swinging force of the pendulum 7 is decreased by offsetting of wave pressures in front and back of the pendulum.

Figure 4C:
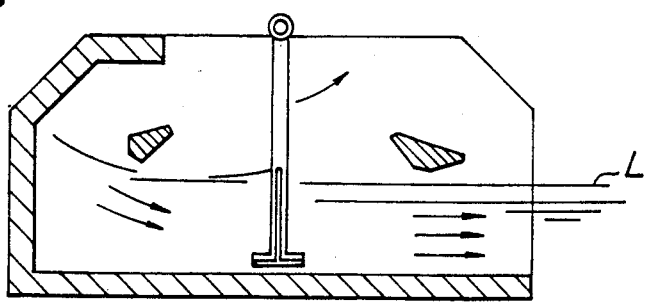

In FIG. 4(c), the water level in the small water chamber F has been returned to an ordinary level L for initiating an anticlockwise swinging movement of the pendulum.

Figure 4D:
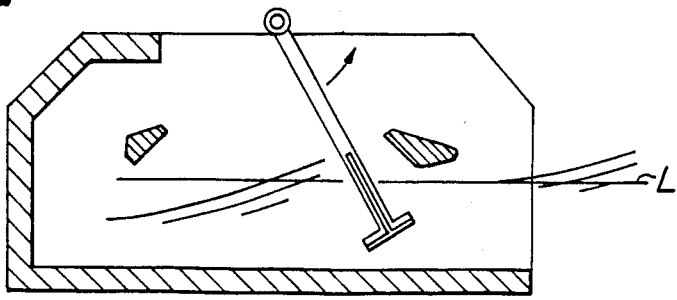

In FIG. 4(d), a returning wave of the ordinary level exerts a rightward-swinging force of an ordinary magnitude on the pressure-receiving plate 8 of the pendulum 7 so as to swing the pendulum 7 to anticlockwise direction in the same fashion as in the case of ordinary wave height.

The above functions may be briefly summarized as follows:

(1) At the initial time of the leftward-swinging movement of the pendulum, an excessively high top part of an incident wave of extraordinary high wave height is severed from the incident wave, and the severed excessive top part of the wave is introduced in the small water chamber F. Thereby, the water level in the small water chamber F is raised to decrease or offset the leftward-swinging force of the pendulum.

(2) At the later period of the leftward-swinging movement of the pendulum, the water flow in the small water chamber F is reversed. By the reversal of the water flow, the water in the small water chamber is further raised in level to reduce or offset the leftward-swinging force of the pendulum and partially impinged upon the front surface of the swinging pendulum and mainly discharged to the sea side or the exterior of the small water chamber F through the open gate of the pendulum so as to prevent an occurrence of excessive rightward swinging force which would be produced by the subsequent rightward-movement of the pendulum.

A mere presence of the back plate as in the inventors' prior apparatus of No. 137,665/82 without the provision of the severer 42 and the guide means 40 and 41 can never afford the above functions (1) and (2) and the pendulum is swung up extraordinary high beyond an endurable limit of the apparatus so that the apparatus is broken.

As explained above, in the present invention, wave pressure is controlled by controlling wave movement. Because wave pressure originates from wave movement, both of wave pressure and the controlling action of wave movement become functions of wave height. Hence, when wave pressure is increased, the controlling action or offsetting action is naturally increased to adapt and achieve well the purpose of the present invention.

Illustrative circuits for converting the discharged oil pressure to electric current of the apparatus of the present invention will be explained hereinbelow with reference to FIGS. 5-7.

Figure 5:
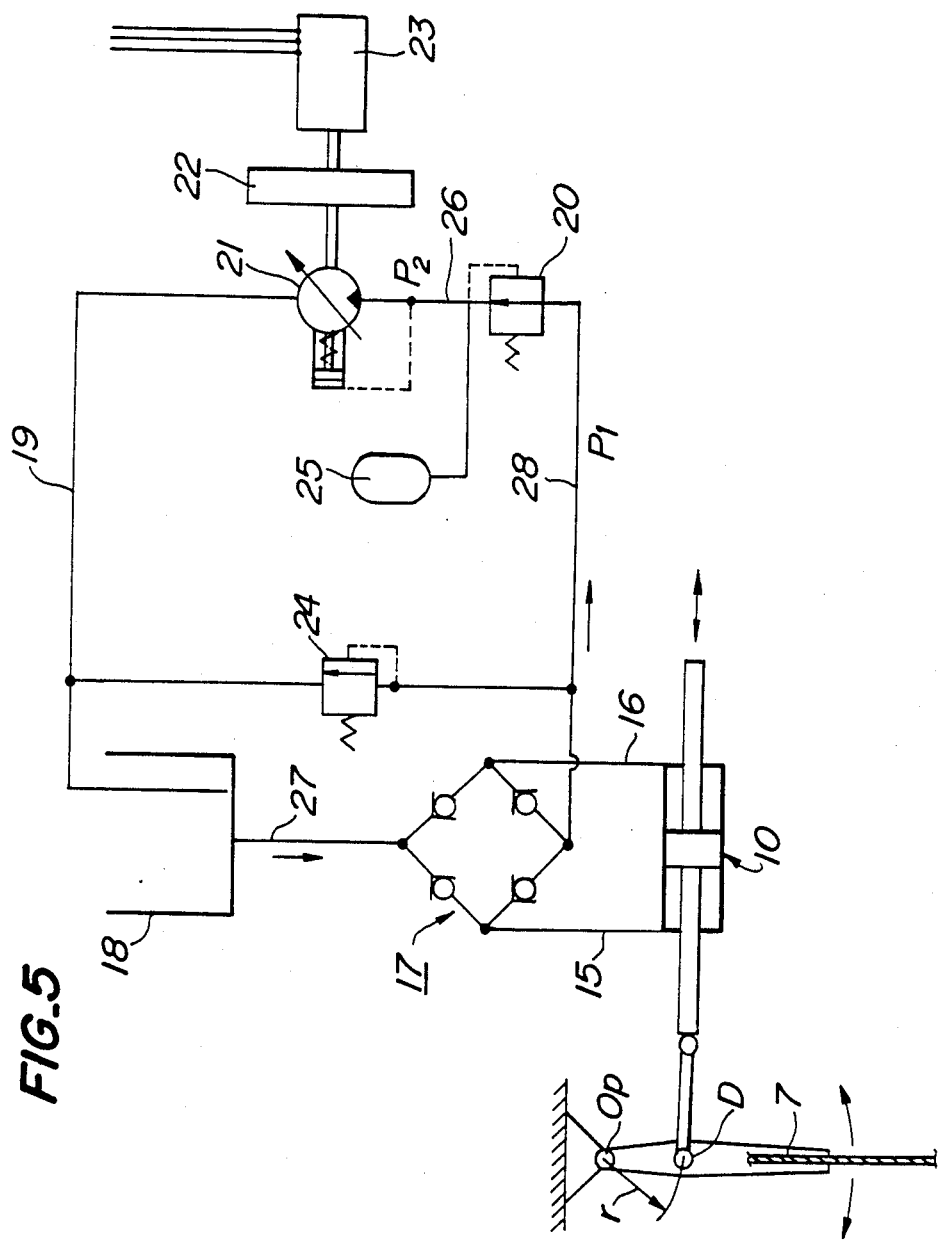
FIG. 5 is a schematic view showing a diagram of a circuit for converting discharged hydraulic pressure discharged from the hydraulic pressure cylinder 10 to electric energy.

In FIG. 5, the pendulum 7 is swung by a stationary wave to actuate the hydraulic pressure cylinder 10 which in turn discharges oil in the pipe 28 to rotate the oil pressure motor 21 which operates the A.C. or D.C. current generator 23 to provide electric power.

The generator 23 is of a synchronous or induction type and preliminarily connected to the public electric power network, so that it has been rotated with a synchronous revolution rate regardless of the driving torque of the oil pressure motor 21.

Under a situation at which the wave energy absorption rate is maximum, the motion of the pendulum 7 is depicted as a sine curve movement relative to time. In this case, the displacement $X_c$ of the piston of the hydraulic pressure cylinder 10 is expressed by the following equation.

$$X_c = X_{cm} \sin\left(\frac{2\pi}{Tw} t\right) \tag{2}$$

wherein $X_{cm}$ is a half amplitude of the cylinder. Time t is measured from a starting point at which the hydraulic pressure cylinder 10 is at a central or neutral position.

$$\dot{X}_c = \frac{2\pi}{Tw} X_{cm} \cos\left(\frac{2\pi}{Tw} t\right) \tag{3}$$

Therefore, the volume or amount $Q_c$ discharged from the hydraulic pressure cylinder 10 is, when the cross sectional area of the cylinder 10 is expressed by Ac, shown by the following equation $$Qc = Ac|\dot{X}_c| = \frac{2\pi}{Tw} Ac\, X_{cm} \left|\cos\left(\frac{2\pi}{Tw} t\right)\right| \tag{4}$$

wherein, the flow rate Qc is always a flow of positive direction (discharge direction) by the action of the flow rectifier valve 17. The flow rate Qc periodically changes or fluctuates as expressed by the equation (4). If the fluctuating flow rate Qc is introduced in the oil pressure motor 21 without any control, the oil pressure motor 21 would be rotated at varying speeds depending on the fluctuating flow rate. If the oil pressure motor 21 is combined directly with the generator 23 which is preliminarily rotated at a constant revolution rate, the result would be a wide fluctuation of the pressure P2 in the pipeline 26 of the supply side of the oil pressure motor 21. Now, a situation is studied wherein the volume expelled by the oil pressure motor 21 is defined as Dm and the pressure P2 is controlled by adjusting the volume Dm being expelled. At first, as a premise, incoming volume Qm to the oil pressure motor 21 is regarded as equal to the discharged volume Qc of the hydraulic pressure cylinder 10. Namely, $$Qm = Qc \tag{5}$$

When considering an ideal state wherein the oil pressure motor 21 is rotated in synchronism with the generator 23 to supply always an adequate energy to the generator side, a relation of the following equation is formed between the flow rate Qc and the expelling volume.

$$Qc = Dmn_g/\eta_v \qquad (6)$$

wherein, $n_g$ is a constant revolution rate of the generator 23 and $\eta_v$ is a volume efficiency of the oil pressure motor 21. Therefore, under the condition of the equation (6), the volume Dm being expelled is expressed as follows.

$$Dm = \frac{Qc}{n_g\eta_v^{-1}} \qquad (7)$$

The equation (4) is incorporated into the equation (7) to obtain $$Dm = \frac{Ac}{n_g\eta_v^{-1}} |\dot{X}_c| \qquad (8)$$

The volume of oil being expelled from the oil pressure motor 21 may be regulated by the pressure $P_2$ according to the following equation (9). This can be easily accomplished by attaching a so-called pressure compensator to the oil pressure motor 21.

$$Dm = \beta m P_2 \qquad (9)$$

wherein, $\beta m$ is a proportional constant. The equation (9) is incorporated into the equation (8) to obtain $$P_2 = \frac{Ac}{\beta m n_g\eta_v^{-1}} |\dot{X}_c| \qquad (10)$$

Hence, if Dm is controlled by $P_2$ so as to satisfy the equation (9), the pressure $P_2$ is proportional to the speed $\dot{X}_c$ of the hydraulic pressure cyulinder 10.

The resistive force $F_p$ caused by the hydraulic pressure cylinder 10 is shown by $A_pP_2$ on the hydraulic pressure cylinder (when the hydraulic pressure cylinder inner pessure can be regarded as equal to $P_2$).

$$F_p = A_pP_2 = \frac{A_pAc}{\beta m n_g\eta_v^{-1}} \dot{X}_c \qquad (11)$$

(because $\dot{X}_c = r_c\dot{\theta}$)

Therefore, the resistive force $F_p$ caused by the hydraulic pressure cylinder 10 becomes proportional to the swinging angle velocity $\dot{\theta}$ of the pendulum.

The above matters are summarized as follows.

(a) The generator 23 is preliminarily connected to the public electric power network to be rotated at a constant revolution rate.

(b) Volume of oil Dm being expelled by the oil pressure motor 21 which actuates the generator 23 resulting from the action of wave force energy is controlled in proportion to the discharge pressure P from the hydraulic pressure cylinder 10.

(c) The hydraulic pressure cylinder 10 is actuated by the pendulum 7 to discharge a volume of oil which actuates the oil pressure motor 21.

(d) The equation of motion relating to the pendulum in FIG. 5 becomes a same shape with the equation (1), and a maximum energy conversion rate can be obtained in case of actuating the hydraulic pressure cylinder 10 by wave force energy.

The flywheel 22 is interposed between the oil pressure motor 21 and the generator 23 for preventing an excessive large velocity fluctuation of the generator 23 due to fluctuation of torque driving the oil pressure motor 21. The flywheel 22 is provided with a one-way clutch not shown, so that the oil pressure motor 21 can drive the generator 23 and backflow of energy from the generator 23 to the oil pressure motor 21 in case when the speed of the oil pressure motor is decreased is prevented. Therefore, there are always cases wherein an electric current is supplied to the public electric power network by the swinging movement of the pendulum 7, while there is no worry that the pendulum 7 is swung by the electric power supplied form the public electric power network. The pressure accumulator 25 absorbs a rapid change of the pressure $P_2$ to decrease the fluctuation of the driving torque of the oil pressure motor 21.

It is not advantageous from an economical view point to select an excessively large capacity oil pressure motor considering an overload at the time of stormy weather. A counter plan to such stormy weather is to provide a pressure-reducing valve 20 and a relief valve 24.

A relation between the hydraulic pressure cylinder piston displacement $X_c$ and the pressure $P_1$ of FIG. 5 is shown in FIG. 6. When the piston displacement $X_c$ is shown by the equation (2) and $P_1$ is $P_1 \propto Qc$, $P_1$ or $Qc$ relative to the displacement $X_c$ can be represented as shown in FIG. 6. The relation is represented by a small semi-circle $R_S$ when the wave height H is a standard value. In such a case, the maximum pressure occurs at the point b. Size and dimension of various parts are selected such that the maximum pressure coincides with a permissible maximum pressure $P_{2max}$ of the oil pressure motor 21. On the other hand, in case when a wave of an expected maximum wave height acts, the relation is represented by a large semi-circle $R_L$. If there is no presusre-reducing valve 20, the maximum pressure in such case is represented at the point a. However, because the maximum pressure at the point a at that time exerts a larger pressure than the permissible maximum pressure $P_{2max}$ to punctuate the oil pressure motor 21, the pressure-reducing valve 20 is so controlled that the pressure $P_2$ urging on the oil pressure motor 21 does not exceed the pressure $P_{2max}$ at the maximum. The relief valve 24 is provided to control the maximum value of the pressure $P_1$ so as not to exceed the point a.

The area encircled by the semicircle and the axis $X_c$ of FIG. 6 is proportional to the energy absorbed by the displacement $X_c$ of the piston of the hydraulic pressure cylinder 10. As can be seen from this characteristic of FIG. 6, the oil pressure motor 21 is not used excessively, so that absorption of energy is effected within a limit in which the hydraulic pressure cylinder 10 can withstand.

FIG. 6 is an illustrative example wherein a plurality of constant volume type oil pressure motors are used instead of the variable volume type oil pressure motor of FIG. 5. Because the variable volume type oil pressure motor has a tendency that its efficiency is rapidly decreased when Dm becomes small, the system of FIG. 7 is a counterplan to such tendency. The counterplan is to combine a plural sets of efficient constant volume type oil pressure motors and to control number of the motors to be operated depending on the pressure $P_2$ so as to approximately satisfy the relation of the equation (9). The system of FIG. 7 is suited to a case wherein generation capacity is so large that a single oil pressure motor is hardly afford such large generation capacity. Each oil pressure motor 30a, 30b, 30c and 30d drives the generator 23 by the gear assembly 31 via the one-way clutches 32a, 32b, 32c and 32d. At a low range of oil pressure $P_2$, the oil pressure motor 30a is operated solely to drive the generator 23. Accompanying the sequential increase of the pressure $P_2$, sequence valves 33b, 33c and 33d are sequentially opened to operate the oil pressure motors 30b, 30c and 30d for jointly driving the generator 23. In this case, a flywheel 22' is not provided with a one-way clutch.

Output torque Mm of the oil pressure motor is expressed by the following equation.

$$Mm = \frac{P_2 D_m}{2\pi} \eta_t \qquad (12)$$

wherein $\theta_t$: torque efficiency of the oil pressure motor.

The equation (8) is incorporated in the equation (12) to obtain $$Mm = \frac{Ac|\dot{X}_c|\eta_t}{2\pi n_g \eta_v^{-1}} \cdot P_2 \qquad (13)$$

The equation (10) is incorporated into the equation (13) to obtain the following equation (14)

$$Mm = \frac{\eta_t}{2\pi \beta m} \left( \frac{Ac|\dot{X}_c|}{n_g \eta_v^{-1}} \right)^2 \qquad (14)$$

As seen from the above equation (14), the generator is driven by the torque Mm which is proportional to the square of the cylinder velocity $\dot{X}_c$ as shown by the equation (14), while revolving at a constant revolution rate.

Thus, according to the present invention discharged hydraulic pressure from the hydraulic pressure cylinder is converted efficiently into electric current while maintaining the advantages of the basic apparatus, because the generation is effected more efficiently to incorporate the generated electric power into the public power supply network with a simple structure and low investment and maintainance costs. From these viewpoints, the present invention far superior to other system in that the energy cost is low and practical effects are very large, so that it is very useful industrially.

Thus, according to the present invention, excessive wave pressure due to excessively high wave is decreased or offset by controlling the wave movements. Therefore, the apparatus of the present invention can withstand to excessively large wave pressure at extraordinary sea phenomen without directly reinforcing the apparatus, so that it is relatively much stronger and cheaper than the inventors' prior apparatus of No. 137,655/82.

In addition, the apparatus of the present invention can be operated by a light pendulum, so that not only the construction cost is cheap, but also the operation efficiency at usual time is very high. Moreover, the apparatus can withstand to wave energy of extraordinary sea phenomenon such as typhoon and convert it to electric energy efficiently. Thus, operation efficiency through the whole year is also high noticeably. Therefore, economicity of the apparatus can be improved extensively, so that the produced electric power can substitute for conventional energies, which could not be achieved by the inventors' prior art of No. 137,655/82.

Furthermore, the apparatus is simple in structure, so that it can easily endure the use at the sea of severe natural environment. In addition to superior advantages of a prior resonant pendulum type apparatus of generating electric power by wave force, the apparatus of the present invention has effectively and remarkably increased resistivity to sea water with superior efficiency and splendid economicity. Therefore, the present invention achieves an eminent improvement of the inventors' prior apparatus of No. 137,655/82, so that it is practially much useful industrially.

Though the present invention has been described with a specific example, it is of course apparent to those skilled in the art that various changes and modifications thereof are possible without departing the broad spirit and aspect of the present invention as hereinafter claimed.

What is claimed is:

1. In a resonant type apparatus for generating electric power by wave force including at least one caisson having a bottom plate, a back plate and side plates opening in an opposite side of the back plate and opening at least part of an upper portion of the caisson to form therein a water chamber, said caisson being arranged to form at least part of a break-water, bank and the like facing to the sea, and a pendulum with a pressure-receiving plate having a natural period in swinging substantially the same periods of stationary wave surges of water caused in the water chamber and arranged in the caisson at a distance from the back plate one fourth of lengths of the stationary wave surges which swing the pendulum to absorb wave energy to convert it into electric energy, the improvement comprising an incident wave-severer arranged in the caisson at the sea side relative to the pendulum for severing an excessive upper part of the incident wave which exceeds a given limit height at the time of an extraordinary sea phenomenon to introduce the severed excessive upper part of the incident wave into a small water chamber formed in the caisson between the pendulum and the back plate over the pressure-receiving plate of the pendulum, and a guide means composed of an oblique back plate which forms an upper part of the back plate facing obliquely and downwardly to the pendulum and a top plate connected to the oblique back plate for reversing the water flow in the samll water chamber obliquely and downwardly to impinge a part of the reversed flow upon the front surface of the pendulum and to discharge main part of the reversed flow into the sea behind the pendulum over the pressure-receiving plate of the pendulum.

2. An apparatus as defined in claim 1, wherein the incident wave-severer serves also as a stopper for the pendulum.

3. An apparatus as defined in claim 2, wherein the severer has a cushion member at the rear surface thereof.

4. An apparatus as defined in claim 1, wherein the severer has a slide member which is adjustable in length by means of a hydraulic cylinder.

5. An apparatus as defined in claim 1, comprising a stopper arranged in the caisson before the pendulum for preventing excessive swinging movement of the pendulum to the back plate direction.

6. An apparatus as defined in claim 5, wherein the stopper has a cushion member at the side opposing the pendulum.

7. An apparatus as defined in claim 1, comprising a hydraulic cylinder driven by the pendulum to discharge oil therefrom, at least one oil pressure motor connected to the cylinder and driven by pressure of the oil discharged from the hydraulic cylinder to rotate with an expelled volume which is proportional to the discharged oil pressure, and a synchronous or induction generator connected to the public electric power network to revolve at a constant revolution rate, the load acting on the pendulum by the hydraulic cylinder being proportional to the swinging velocity $\theta$ of the pendulum and the magnitude of the load acting on the pendulum being equal to the moment of the pendulum by generating waves.

8. An apparatus as defined in claim 1, comprising a presusre-reducing device arranged independently from a device of controlling a relief pressure of the oil pressure motor for controlling the maximum value of the discharged oil pressure acting on the oil pressure motor to a smaller value than an overload value of the oil pressure motor.

9. An apparatus as defined in claim 1, comprising an adjusting device for adjusting proportional constant $\beta m$ of a pressure compensator of the oil pressure motor corresponding to a change of the moment of the pendulum by generating waves.

10. In a method of generating electric power by wave force energy wherein a pendulum with a pressure-receiving plate is hanged at a position of a node of a stationary wave in a caisson and swung by the stationary wave in reciprocal movement and a hydraulic pressure cylinder is actuated by the reciprocal movement of the pendulum to discharge oil therefrom and the oil pressure of the discharged oil is converted to electric energy, the improvement comprising the steps of severing an upper excessive part of an incident wave by an incident wave-severer at the front sea side of the pendulum when wave height of the incident wave exceeds a certain limit height due to extraordinary sea phenomenon such as typhoon, introducing the severed upper part into a small water chamber before the pendulum to raise water level and water pressure therein so as to partially decrease incident wave pressure pushing the pendulum, reversing a water flow in the water level raised small water chamber in an oblique lower backward direction by means of an oblique back plate which forms an upper part of the back plate and a top plate connected thereto to increase water pressure in front of the pendulum and to decrease the incident wave pressure pushing the pendulum, impinging a part of the reversed flow upon the front surface of the forwardly swinging pendulum to increase wave pressure in front of the swinging pendulum and offset the incident wave pressure, and discharging a part of the reversed flow into the sea behind the pendulum over the pressue-receiving plate of the pendulum to decrease water level and water pressure in the small water chamber and to raise water level and water pressure in the sea behind the pendulum so as to offset the water pressure in the small water chamber which swings the pendulum back to the sea direction, whereby excessive wave pressure which would act on the pendulum at the time of extraordinary sea phenomenon is prevented by the direct control of wave pressures in the caisson utilizing the wave movements.

11. A method as defined in claim 10, wherein the height of the incident wave-severer is adjusted depending on ebb and flow of the tide.

12. A method as defined in claim 10, wherein excessive swinging movement of the pendulum to the back plate direction is prevented by a stopper arranged at the front upper portion in the caisson.

13. A method as defined in claim 10, wherein the incident wave-severer serves as a stopper which prevents excessive swinging movement of the pendulum to the sea direction.

* * * * *